United States Patent
Liu

(12) United States Patent (10) Patent No.: US 7,555,022 B2
Liu (45) Date of Patent: Jun. 30, 2009

(54) REDUCTION OF PULSE WIDTH BY SPECTRAL BROADENING IN AMPLIFICATION STAGE AND AFTER AMPLIFICATION STAGE

(75) Inventor: Jian Liu, Sunnyvale, CA (US)

(73) Assignee: Polar Onyx, Inc., Sunnyvale, CA (US)

( * ) Notice: Subject to any disclaimer, the term of this patent is extended or adjusted under 35 U.S.C. 154(b) by 74 days.

(21) Appl. No.: 11/701,276

(22) Filed: Jan. 31, 2007

(65) Prior Publication Data

US 2007/0177643 A1 Aug. 2, 2007

Related U.S. Application Data

(60) Provisional application No. 60/765,600, filed on Feb. 1, 2006.

(51) Int. Cl.
*H01S 3/30* (2006.01)
(52) U.S. Cl. ................... 372/6; 372/18; 372/30
(58) Field of Classification Search ........... 372/6, 372/18
See application file for complete search history.

(56) References Cited

U.S. PATENT DOCUMENTS

| 7,414,780 | B2 * | 8/2008 | Fermann et al. | 359/337 |
| 2004/0057682 | A1 * | 3/2004 | Nicholson et al. | 385/122 |
| 2006/0120418 | A1 * | 6/2006 | Harter et al. | 372/30 |
| 2007/0002910 | A1 * | 1/2007 | Liu et al. | 372/25 |
| 2007/0047595 | A1 * | 3/2007 | Liu et al. | 372/6 |
| 2007/0171945 | A1 * | 7/2007 | Liu et al. | 372/6 |

* cited by examiner

*Primary Examiner*—Dung T Nguyen
(74) *Attorney, Agent, or Firm*—Xin Wen

(57) ABSTRACT

This invention discloses a fiber Chirped Pulse Amplification (CPA) laser system. The system includes a fiber mode-locking oscillator for generating a seed laser. The laser system further includes a stretching stage for stretching the seed laser for projecting to an Yb doped amplifier. The Yb doped amplifier is implemented for taking advantage of a self phase modulation (SPM) to broaden a spectrum whereby an amplification of the laser pulse is without narrowing down the spectrum. The amplifier has a gain spectrum corresponding to a broaden spectrum by taking advantage of the SPM in the amplifier. The amplifier is further connected to an output fiber having a predefined length with a predefined level of SPM for broadening a spectrum.

23 Claims, 3 Drawing Sheets

Schematic diagram of experiment setup

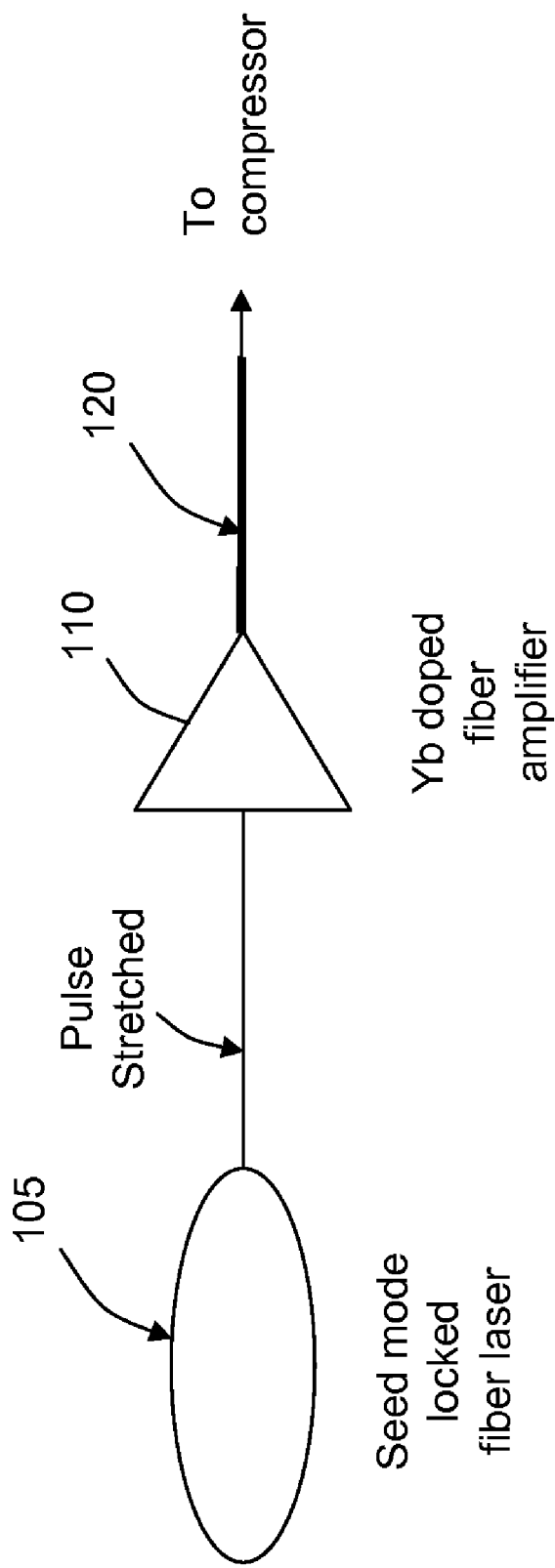
Figure 1. Schematic diagram of experiment setup

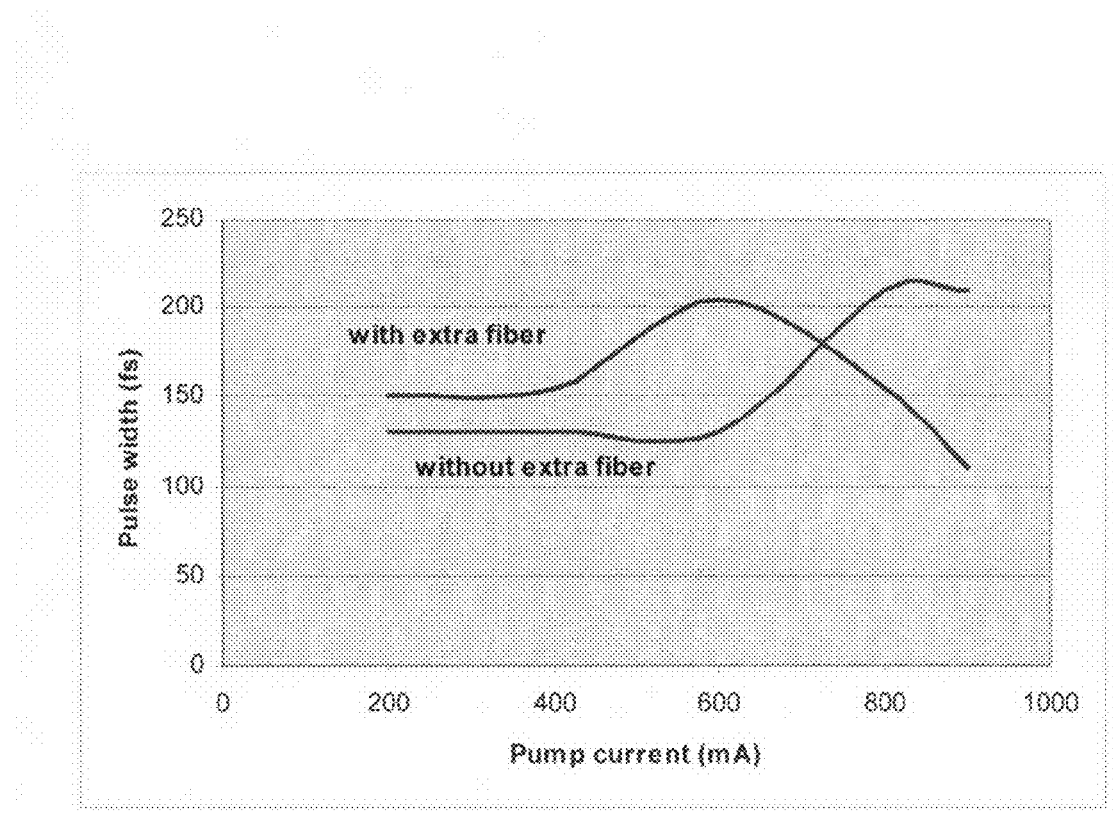
Figure 2 pulse width vs pump current with and without extra length of fiber at the output

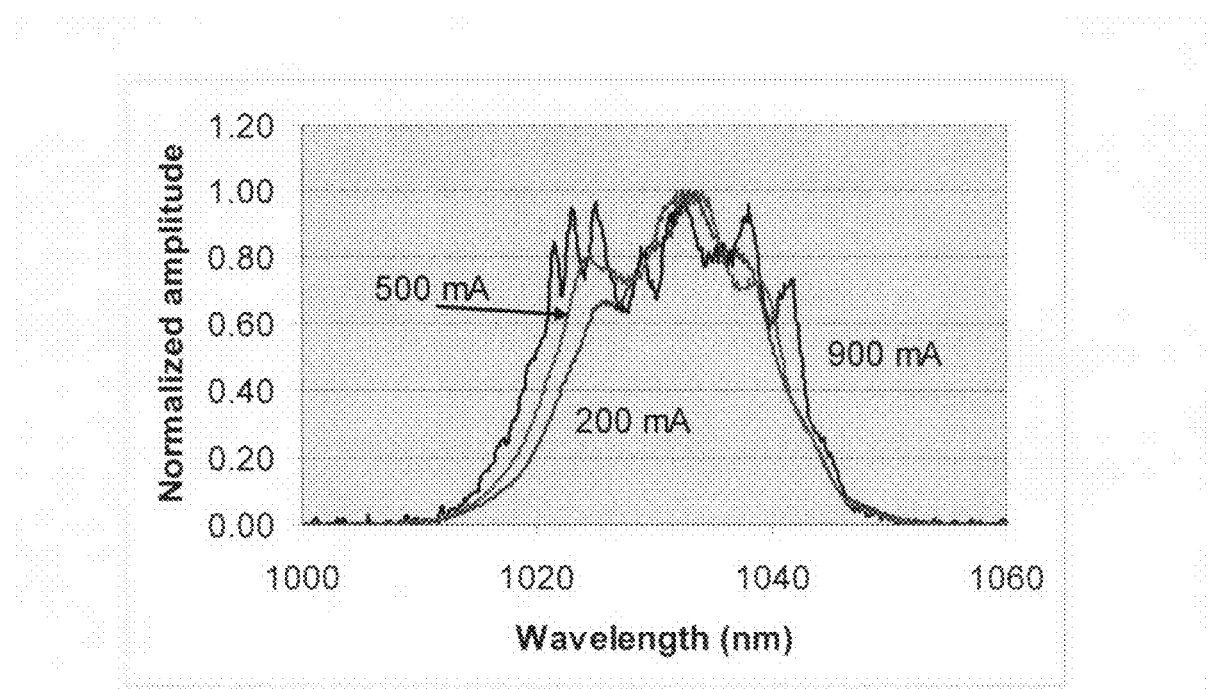
Figure 3 Spectra for various pump power for the one with extra fiber
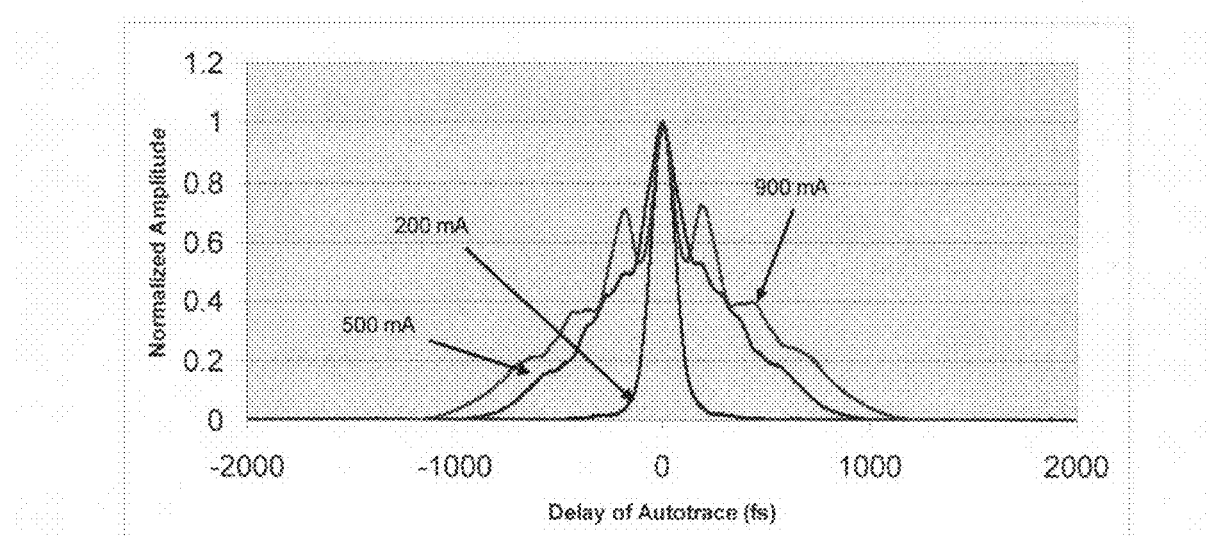
Figure 4 Pulse width for various pump power for the one with extra fiber

REDUCTION OF PULSE WIDTH BY SPECTRAL BROADENING IN AMPLIFICATION STAGE AND AFTER AMPLIFICATION STAGE

This Formal Application claims a Priority Date of Feb. 1, 2006 benefit from a Provisional Patent Application 60/765,600 filed by the one common Inventor of this application. The disclosures made in 60/765,600 are hereby incorporated by reference in this Patent Application.

FIELD OF THE INVENTION

The present invention relates generally to apparatuses and methods for providing fiber laser system. More particularly, this invention relates a system configuration by applying a SPM spectral broadening technique for reducing the pulse width in the amplification stage and after the amplification stage.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, when a short pulse high power laser is transmitted through a length of fiber and several stages of amplifiers, the pulse is distorted due to nonlinear effects (such as self phase modulation (SPM), gain narrowing effect GNE, etc., and the pulse width usually becomes broadened. The broadened pulse width thus increases the difficulties of generating the high-energy laser of short pulse lasers, e.g., a laser with a femtosecond pulse width.

Furthermore, in a fiber laser system implemented with the Chirped Pulse Amplification (CPA) for short pulse high power laser amplifier, the CPA systems are still limited by the technical difficulties that the third order dispersion (TOD) limits the scalability of the laser systems. Such limitations were not addressed in the conventional technologies due to the fact that the conventional solid-state laser utilizes Grating-Lens combination and Treacy compressor for pulse stretching and compressing. Ideally, in such solid-state systems, all orders of dispersion can be compensated, but the material dispersion can distort and damage this ideal situation. But the material dispersion is not a serious problem in solid-state laser system because the material dispersion is generally considered as not important. However, for a fiber laser system, the situation is different due to the fact that in the fiber laser systems, attempts are made by using the fiber stretcher to replace the grating-lens combination for the purpose of significantly increasing the system reliability. However, the TOD limits the ability for de-chirping when using Treacy compressor since both fiber stretcher and Treacy compressor have positive TOD even this combination can remove the second order dispersion completely. This issue of TOD dispersion makes it more difficult to develop a high-energy fiber laser amplifier with <200 fs pulse width. Actually, the technical difficulty of TOD dispersion is even more pronounced for laser system of higher energy. A laser system of higher energy requires a higher stretch ratio and that leads to a higher TOD. Therefore, for laser system of higher energy, it is even more difficult to re-compress the pulse to the original pulse width.

A chirped Pulse Amplification (CPA) is widely implemented with four parts: a mode-locking (ML) oscillator providing short pulse, a stretcher to get long pulse duration, an amplifier to get high energy, and a compressor to get short pulse and high peak power. In order to obtain a very high peak power, it is required to obtain a high energy and short pulse width at the same time. However, the issue of generating a short pulse width in a fiber laser system is always difficult to achieve due to an uncompensated highly positive third-order dispersion (TOD) generally referred to as the compressibility issue. For the purpose of resolving this compressibility issue, a number of ideas, including new compressor design[1] and new stretcher are disclosed in different patent applications including patent applications Ser. No. 06/062,205 and Ser. No. 06/062,905 and the disclosures are hereby incorporated as reference in this Patent Application. In the application Ser. No. 06/062,906, the self-phase modulation (SPM) was intentionally created and utilized in the stretcher stage in order to reduce the stretcher fiber length and the TOD impact. In addition to above disclosures made by the Applicant of this invention, further improvements to the laser system are still required to resolve this compressibility issue.

In the conventional laser system, the elimination of all nonlinear effects is generally considered as a desirable goal in the conventional design of the high-energy fiber laser system, It was widely believed that the nonlinear effects will degrade the pulse quality and stability. However, in practice, this conventional dogmatic design concept is no longer considered as universally acceptable. A specific example is the use of the Stimulated Raman Scattering (SRS) effects in a fiber Raman amplifier, and nonlinear phase shift accumulated in the amplifier stage was implemented to compensate the TOD. However, in the CPA fiber laser system, the SRS scattering must be avoided. The concept of applying the phase shift and spectral generation for improvement of pulse quality as that disclosed in a fiber Raman amplifier does not provide a direct solution to the difficulties caused by the compressibility issues due to the technical challenges arise from the third order dispersion effects.

Therefore, a need still exists in the art of fiber laser design and manufacture to provide a new and improved configuration and method to provide fiber laser to overcome the gain narrowing effect in amplifying the laser pulses such that the above-discussed difficulty may be resolved.

SUMMARY OF THE PRESENT INVENTION

It is therefore an aspect of the present invention to provide a laser system for reducing the pulse width by increasing the pulse spectral bandwidth wherein the spectral bandwidth is broadened by taking advantage of the SPM effects. The laser transmission with broadened spectrum can be amplified without suffering the gain narrowing effects such that the above-discussed difficulties of spectral narrowing effect during the pulse amplifications as that encountered in the prior art may be resolved.

Another aspect of this invention is to provide a laser system for reducing the pulse width by increasing the pulse spectral bandwidth by taking advantage of the SPM that may take place in wide varieties of fibers. The system takes advantage of the SPM effects for broadening the spectral bandwidth wherein the SPM may take place in many short pulse amplifiers including the amplifiers implemented with Yb doped fibers, Er doped fibers, Er/Yb codoped fibers, Tm doped fibers. The fibers can be single mode and/or multimode and/or a combination of two or more types of fibers. The amplifiers may be implemented with fibers of single cladding, double cladding, or air cladding, or Photonic crystal fibers. The amplifier can be a high energy, i.e., a multiple staged amplifier, or a low energy, i.e., a single stage amplifier.

Another aspect of this invention is to provide a laser system for reducing the pulse width by increasing the pulse spectral bandwidth by taking advantage of the SPM that may take place in wide varieties of fibers. The system is therefore implemented with amplifiers that have the amplifier gains that would be wide enough to support the broadened spectrum by the SPM effects.

Another aspect of this invention is to provide a laser system for reducing the pulse width by increasing the pulse spectral bandwidth by taking advantage of the SPM that may take place after the amplification stage such that the broadening spectrum will not be limited by the gain spectrum of the amplifier. The length of the fiber implemented after the amplification stage should have appropriate length in order to generate the required spectrum bandwidth without having serious wave breaking effect Briefly, in a preferred embodiment, the present invention discloses a fiber Chirped Pulse Amplification (CPA) laser system that includes a fiber mode-locking oscillator for generating a laser for projecting to a doped amplifier implemented for taking advantage of a self phase modulation (SPM) to broaden a spectrum whereby an amplification of the laser pulse is without narrowing down the spectrum. In an exemplary embodiment, the amplifier is implemented with a Yb doped fiber for taking advantage of a self phase modulation (SPM) to broaden a spectrum whereby an amplification of the laser pulse is without narrowing down the spectrum. In an exemplary embodiment, the amplifier is implemented with a Er doped fiber for taking advantage of a self phase modulation (SPM) to broaden a spectrum whereby an amplification of the laser pulse is without narrowing down the spectrum. In an exemplary embodiment, the amplifier is implemented with a Er/Yb co-doped fiber for taking advantage of a self phase modulation (SPM) to broaden a spectrum whereby an amplification of the laser pulse is without narrowing down the spectrum. In an exemplary embodiment, the amplifier is implemented with a Tm doped fiber for taking advantage of a self phase modulation (SPM) to broaden a spectrum whereby an amplification of the laser pulse is without narrowing down the spectrum. In an exemplary embodiment, the amplifier is implemented with a single mode, a multi-mode, a combination of two or more types, a single cladding, double cladding, or air cladding, or Photonic crystal fibers for taking advantage of a self phase modulation (SPM) to broaden a spectrum whereby an amplification of the laser pulse is without narrowing down the spectrum. In an exemplary embodiment, the amplifier is further connected to an output fiber having a predefined length with a predefined level of SPM for broadening a spectrum whereby an amplification of the laser pulse is without narrowing down the spectrum. In an exemplary embodiment, the laser system further includes a stretching stage for stretching the seed laser before projecting to the amplifier. In an exemplary embodiment, the amplifier having a gain spectrum corresponding to a broaden spectrum by taking advantage of the SPM in the amplifier.

In an exemplary embodiment, this invention further discloses method of generating fiber laser. The method includes a step of generating a laser from a fiber oscillator. The method further includes a step of projecting the laser from the fiber oscillator to an amplifier comprising a doped fiber for taking advantage of a self phase modulation (SPM) to broaden a spectrum whereby an amplification of the laser pulse is without narrowing down the spectrum. In an exemplary embodiment, the step of amplifying the laser through the amplifier is a step of amplifying the laser with a Yb doped fiber for taking advantage of the self phase modulation (SPM) to broaden a spectrum whereby an amplification of the laser pulse is without narrowing down the spectrum. In another exemplary embodiment, the step of amplifying the laser through the amplifier is a step of amplifying the laser with a Er doped fiber for taking advantage of the self phase modulation (SPM) to broaden a spectrum whereby an amplification of the laser pulse is without narrowing down the spectrum. In another exemplary embodiment, the step of amplifying the laser through the amplifier is a step of amplifying the laser with a Er/Yb co-doped fiber for taking advantage of the self phase modulation (SPM) to broaden a spectrum whereby an amplification of the laser pulse is without narrowing down the spectrum. In another exemplary embodiment, the step of amplifying the laser through the amplifier is a step of amplifying the laser with a Tm doped fiber for taking advantage of the self phase modulation (SPM) to broaden a spectrum whereby an amplification of the laser pulse is without narrowing down the spectrum. In another exemplary embodiment, the step of amplifying the laser through the amplifier is a step of amplifying the laser with a single mode, a multi-mode, a combination of two or more types, a single cladding, double cladding, or air cladding, or Photonic crystal fibers for taking advantage of a self phase modulation (SPM) to broaden a spectrum whereby an amplification of the laser pulse is without narrowing down the spectrum. In another exemplary embodiment, the method further includes a step of projecting the laser from the amplifier to an output fiber having a predefined length with a predefined level of SPM for broadening a spectrum whereby an amplification of the laser pulse is without narrowing down the spectrum. In another exemplary embodiment, the method further includes a step of receiving the seed laser into a stretching stage for stretching the seed laser before projecting to the amplifier. In another exemplary embodiment, the step of amplifying the laser through the amplifier further comprising a step of amplifying the laser through the amplifier having a gain spectrum corresponding to a broaden spectrum in taking advantage of the SPM in the amplifier These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a schematic diagram for showing a fiber laser system with fiber of various lengths to carry out laser system tests.

FIG. 2 is a diagram for showing the pulse width versus pump-current with and without extra length of fiber at the output end.

FIG. 3 is a spectra diagram for various pump power of the laser system with extra fiber.

FIG. 4 is a diagram for showing the pulse width for various pump power for the laser system with extra fiber.

DETAILED DESCRIPTION OF THE INVENTION

Referring to FIG. 1 for a schematic diagram of a laser system 100 that is implemented for taking advantage of the SPM spectral broadening technique of this invention. The laser system 100 includes a laser seed 105 for generating a seed laser. The seed laser 105 is a mode locked fiber laser operating at 1030 nm spectral with about 3 mW of power for projecting a laser into a fiber amplifier 110 using a Yb doped fiber. The seed laser is first stretched to 10 ps pulses before the laser is projected to the amplifier 110. A grating compressor (not shown) is used to compress the laser pulse after amplifier 110. The amplifier output an average power up to 250 mW. FIG. 2 shows that when the length of fiber 120 after the amplifier 110 is 2 m at the output, the pulse width can be reduced significantly because of the SPM induced spectrum broadening. FIG. 2 also shows that the SPM effects distort and broaden the pulse width where there is not enough spectrum broadening. As shown in FIG. 2, the length of the fiber 120 can be optimized to obtain the shortest pulse width in compensating and balancing SPM induced spectrum broadening and TOD. The laser system as disclosed therefore provides additional flexibilities to achieve short pulses with optimized performance. As described above, the comparison is 2 m extra length of the fiber for a particular exemplary embodiment. This works for a particular power level and should be modified to fit case by case that may depend on the power levels. For another amplifier design, maybe 1 m is the best length. The SPM causes the spectrum broadening when the peak power of the pulse reaches to certain level for a given fiber type and length. The broadening factor is a function of the peak power, fiber structure, and fiber length. Depending on the pulse energy level and pulse width (that defines the peak power), the optimized broadening factor can be optimized by selecting the right length and fiber type.

FIG. 3 shows the spectra for various pump power for that setup with extra fiber. It indicated that significant spectrum broadening has occurred for 900 mA pump (for the case with extra fiber) that causes significant improvement for the reduction of the pulse width. FIG. 4 shows the autocorrelation traces. Even a pedestal comes with the higher power output the main peak shows a pulse width narrowing effect due to its spectrum broadening.

This invention discloses a fiber Chirped Pulse Amplification (CPA) laser system. The system includes a fiber mode-locking oscillator for generating a seed laser. The laser system further includes a stretching stage for stretching the seed laser for projecting to an Yb doped amplifier. The Yb doped amplifier is implemented for taking advantage of a self phase modulation (SPM) to broaden a spectrum whereby an amplification of the laser pulse is without narrowing down the spectrum. The amplifier has a gain spectrum corresponding to a broaden spectrum by taking advantage of the SPM in the amplifier. The amplifier is further connected to an output fiber having a predefined length with a predefined level of SPM for broadening a spectrum whereby an amplification of the laser pulse is without narrowing down the spectrum.

According to above descriptions, this invention discloses a method to reduce the laser pulse width by increasing the pulse spectral bandwidth. The key techniques is applied by taking advantage of the SPM to broaden the spectrum such that the amplification of the laser pulse can be performed without narrowing down the spectrum by gain narrowing effect. The spectrum broadening function is based on the phenomenon that when the peak power reaches certain level for a given system, the spectrum will be broadening as a function of the fiber type and fiber length. The techniques are applied to a short pulse amplification using Yb doped fibers, Er doped fibers, Er/Yb codoped fibers, Tm doped fibers. The fibers can be single mode and/or multimode and/or a combination of two or more types of fibers. The fibers can also be single cladding, double cladding, or air cladding, or Photonic crystal fibers.

Therefore, the key features of this invention are:
1. Use SPM to broaden the spectrum in the amplification stage.
2. While broadening the spectrum in the amplification stage, the spectrum should be amplified accordingly instead of narrowing due to limited gain bandwidth. So, the gain of the amplifier should be wide enough to support the broadened spectrum by SPM.
3. Use SPM to broaden the spectrum after amplification. In this way, the broadening spectrum will not be limited by the gain spectrum of the amplifier.
4. In 3, an appropriate length of fiber should be used in obtaining the required spectrum bandwidth without having serious wave breaking effect. The broadening factor is a function of the peak power, fiber structure, and fiber length. Depending on the pulse energy level and pulse width (that defines the peak power), the optimized broadening factor can be optimized by selecting the right length and fiber type. For this particular system, at 250 mW output power, a 2 meter is the best length. Based on the level of power, it can be from 0 m to a few meters.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A fiber Chirped Pulse Amplification (CPA) laser system comprising:
    a fiber mode-locking oscillator configured to generate an input laser beam having a first spectral width;
    a doped-fiber amplifier configured to amplify the input laser beam to produce an amplified laser beam having a second spectral width not narrower than the first spectral width; and
    an optical fiber having a predetermined length and configured to pass the amplified laser beam therethrough and to broaden the spectrum of the amplified laser beam, wherein the output optical fiber outputs an output laser beam having a third spectral width broader than the second spectral width.

2. The fiber CPA laser system of claim 1, wherein the input laser beam comprises an input laser pulse having a first pulse width, wherein the amplified laser beam comprises an amplified laser pulse having a second pulse width, and wherein the output laser beam comprises a third laser pulse having a third pulse width narrower than the second pulse width.

3. The fiber CPA laser system of claim 2, wherein the second pulse width is not wider than the first pulse width.

4. The fiber CPA laser system of claim 2, further comprising a stretching stage configured to stretch the input laser pulse to produce a stretched laser pulse having a stretched pulse width, wherein the doped-fiber amplifier is configured to amplify the stretched laser pulse to produce the amplified laser pulse.

5. The fiber CPA laser system of claim 4, wherein the second pulse width is not wider than the stretched pulse width.

6. The fiber CPA laser system of claim 1, wherein the doped-fiber amplifier is characterized by a gain spectral width, wherein the third spectral width is broader than the gain spectral width.

7. The fiber CPA laser system of claim 1, wherein the input laser beam has a peak power lower than 10 mW, wherein the output laser beam has a peak power higher than 100 mW.

8. The fiber CPA laser system of claim 1, wherein the doped-fiber amplifier is formed by a single-mode fiber.

9. The fiber CPA laser system of claim 1, wherein the doped-fiber amplifier is formed by a multi-mode fiber.

10. The fiber CPA laser system of claim 1, wherein the doped-fiber amplifier is formed by a combination of a single-mode fiber-segment and a multi-mode fiber segment.

11. The fiber CPA laser system of claim 1, wherein the doped-fiber amplifier is formed by a single cladding fiber.

12. The fiber CPA laser system of claim 1, wherein the doped-fiber amplifier is formed by a double cladding fiber.

13. The fiber CPA laser system of claim 1, wherein the doped-fiber amplifier is formed by an air cladding fiber.

14. The fiber CPA laser system of claim 1, wherein the doped-fiber amplifier is formed by a photonic crystal fiber.

15. The fiber CPA laser system of claim 1, wherein the doped-fiber amplifier comprises a dopant selected from the group consisting of Yb, Er, Tm, and a combination of Er and Yb.

16. The fiber CPA laser system of claim 1, wherein the optical fiber has a length between one and three meters.

17. A fiber Chirped Pulse Amplification (CPA) laser system comprising:
    a fiber mode-locking oscillator configured to generate an input laser beam having a first spectral width and comprising an input laser pulse having a first pulse width;
    a stretching stage configured to stretch the input laser pulse to produce a stretched laser pulse having a stretched pulse width;
    a doped-fiber amplifier configured to amplify the stretched laser pulse to produce an amplified laser pulse having a second spectral width not narrower than the first spectral width, wherein the second pulse width is not wider than the stretched pulse width; and
    an optical fiber configured to pass the amplified laser beam therethrough, wherein the optical fiber has a predetermined length and is configured to broaden the spectrum of the amplified laser beam, wherein the output optical fiber outputs an output laser beam having a third spectral width broader than the second spectral width, wherein the output laser beam comprises a third laser pulse having a third pulse width narrower than the second pulse width.

18. The fiber CPA laser system of claim 17, wherein the doped-fiber amplifier is characterized by a gain spectral width, wherein the third spectral width is broader than the gain spectral width.

19. The fiber CPA laser system of claim 17, wherein the optical fiber has a length between one and three meters.

20. The fiber CPA laser system of claim 17, wherein the input laser beam has a peak power lower than 10 mW, wherein the output laser beam has a peak power higher than 100 mW.

21. A method of generating a laser beam, comprising:
    receiving an input laser beam having a first spectral width from a fiber mode-locking oscillator, wherein the input laser beam comprises an input laser pulse having a first pulse width;
    stretching the input laser pulse to produce a stretched laser pulse having a stretched pulse width;
    amplifying the stretched laser pulse by a doped-fiber amplifier to produce an amplified laser pulse, wherein the amplified laser pulse has a second spectral width not narrower than the first spectral width and a second pulse width not wider than the stretched pulse width;
    passing the amplified laser beam through an optical fiber having a predetermined length;
    broadening the spectrum of the amplified laser beam by the optical fiber to produce an output laser beam having a third spectral width broader than the second spectral width, wherein the output laser beam comprises a third laser pulse having a third pulse width narrower than the second pulse width.

22. The method of claim 21, wherein the doped-fiber amplifier is characterized by a gain spectral width, wherein the third spectral width is broader than the gain spectral width.

23. The method of claim 22, wherein the input laser beam has a peak power lower than 10 mW, wherein the output laser beam has a peak power higher than 100mW.

* * * * *